United States Patent [19]

Lux et al.

[11] Patent Number: 5,756,607
[45] Date of Patent: May 26, 1998

[54] PREPARATION OF POLYMERS OF ETHYLENE BY SUSPENSION POLYMERIZATION

[75] Inventors: Martin Lux, Dannstadt-Schauernheim; Roland Saive, Ludswighafen; Franz Langhauser, Bad Dürkheim; Wolfgang Micklitz, Neustadt; Hans-Helmut Görtz, Freinsheim; Dieter Lilge, Limburgerhof, all of Germany

[73] Assignee: BASF Aktiengesellschaft, Ludwigshafen, Germany

[21] Appl. No.: 666,409

[22] PCT Filed: Dec. 13, 1994

[86] PCT No.: PCT/EP94/04125

§ 371 Date: Jun. 26, 1996

§ 102(e) Date: Jun. 26, 1996

[87] PCT Pub. No.: WO95/18160

PCT Pub. Date: Jul. 6, 1995

[30] Foreign Application Priority Data

Dec. 27, 1993 [DE] Germany ............... 43 44 672.8

[51] Int. Cl.[6] .................... C08F 4/64; C08F 2/06
[52] U.S. Cl. ............... 526/127; 526/129; 526/153; 526/160; 526/352; 526/943; 502/117; 502/155
[58] Field of Search ...................... 526/127, 129, 526/153, 160, 352, 943

[56] References Cited

U.S. PATENT DOCUMENTS

| | | | |
|---|---|---|---|
| 3,242,150 | 3/1966 | Scoggin | 260/88.2 |
| 3,248,179 | 4/1966 | Norwood | 23/285 |
| 5,077,255 | 12/1991 | Welborn, Jr. | 502/104 |
| 5,145,818 | 9/1992 | Tsutsui et al. | 502/113 |
| 5,234,878 | 8/1993 | Tsutsui et al. | 502/103 |
| 5,250,629 | 10/1993 | Tani et al. | 125/268 |
| 5,308,816 | 5/1994 | Tsutsui et al. | 502/108 |
| 5,391,660 | 2/1995 | Numao et al. | 526/128 |
| 5,459,217 | 10/1995 | Todo et al. | 526/348.1 |
| 5,525,678 | 6/1996 | Mink et al. | 525/246 |

FOREIGN PATENT DOCUMENTS

| | | |
|---|---|---|
| 206 794 | 12/1986 | European Pat. Off. . |
| 294 942 | 12/1988 | European Pat. Off. . |

*Primary Examiner*—David W. Wu
*Attorney, Agent, or Firm*—Keil & Weinkauf

[57] ABSTRACT

Homopolymers of ethylene or copolymers of ethylene with other olefins or mixtures thereof are prepared by suspension polymerization in the presence of catalyst systems by a process in which the catalyst systems used are those which contain, as active components, A) a finely divided carrier treated with trialkylaluminum,
B) a metallocene complex,
C) an open-chain or cyclic alumoxane compound and
D) an alkali metal alkyl or alkaline earth metal alkyl or a mixture thereof.

20 Claims, 1 Drawing Sheet

PREPARATION OF POLYMERS OF ETHYLENE BY SUSPENSION POLYMERIZATION

BACKGROUND OF THE INVENTION

1. Field of the Invention

The present invention relates to a process for the preparation of homopolymers of ethylene or copolymers of ethylene with other olefins or mixtures thereof by suspension polymerization in the presence of catalyst systems.

2. Description of the Related Art

For example, EP-A 294 942 discloses that metallocene catalysts may be supported in order to obtain polymers having improved morphology. However, this reduces the productivity on the one hand and, on the other hand, wall deposits and the formation of lumps occur during the polymerization.

One preparation process for polymers of ethylene is suspension polymerization. This can be carried out by the Phillips PF (particle forming) process in a continuously operated loop reactor, as described, for example, in U.S. Pat. No. 3,242,150 and U.S. Pat. No. 3,248,179. However, products having a broad molecular weight distribution are formed here.

SUMMARY OF THE INVENTION

It is an object of the present invention to provide a process for the preparation of homopolymers of ethylene or copolymers of ethylene with other olefins or mixtures thereof by suspension polymerization, which process does not have the stated disadvantages.

We have found that this object is achieved by a process for the preparation of homopolymers of ethylene or copolymers of ethylene with other olefins or mixtures thereof by suspension polymerization in the presence of catalyst systems, wherein the catalyst systems used are those which contain, as active components, A) a finely divided carrier treated with trialkylaluminum,
B) a metallocene complex,
C) an open-chain or cyclic alumoxane compound and
D) an alkali metal alkyl or alkaline earth metal alkyl or mixtures thereof.

We have also found the homopolymers of ethylene or copolymers of ethylene with other olefins or mixtures thereof, which homopolymers and copolymers are obtainable thereby.

DESCRIPTION OF THE PREFERRED EMBODIMENTS

Figure 1:
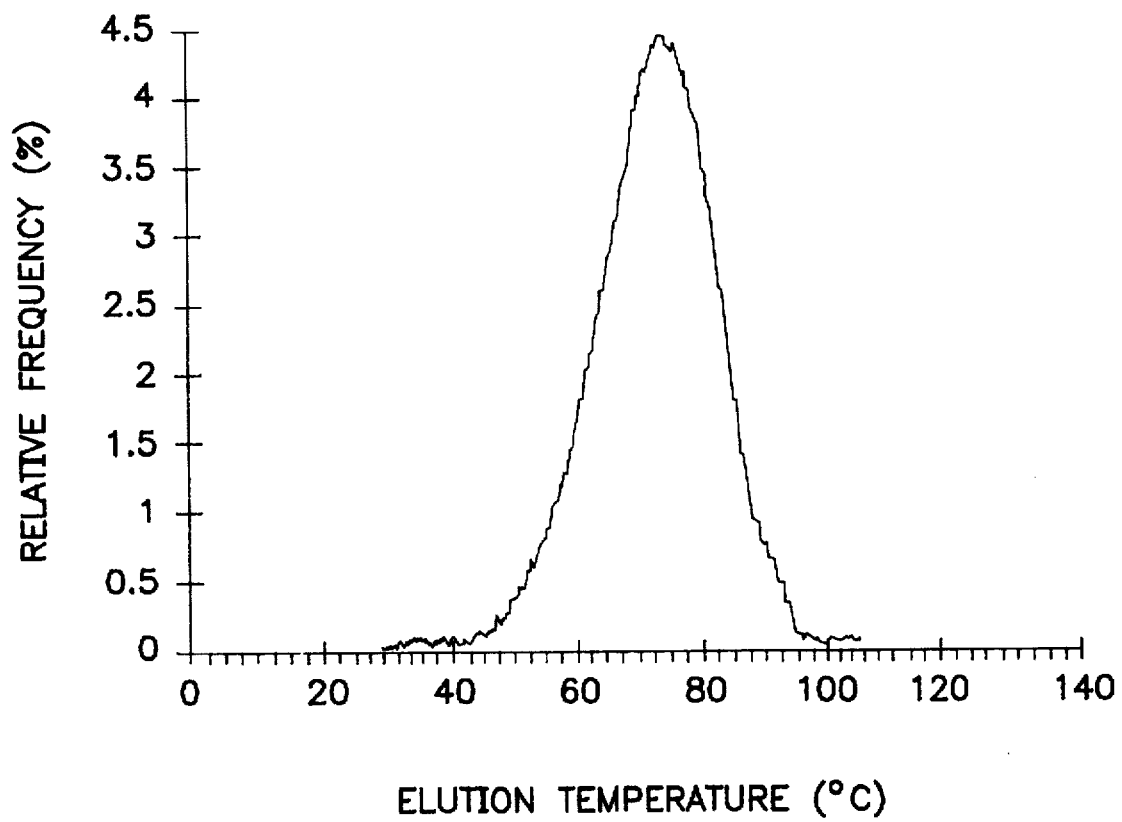

The novel process is used for the preparation of homopolymers of ethylene or copolymers of ethylene or mixtures thereof. Preferred copolymers of ethylene are those in which alk-1-enes, preferably straight-chain branched $C_3$-$C_6$-alk-1-enes, in particular 1-butene and 1-hexene, are used as comonomers. It is also possible to use a plurality of different monomers. The amount of comonomers here is from 0.1 to 80, preferably from 5 to 50, % by weight, based on the total amount of monomers.

In the novel process, the homo- or copolymers of ethylene are prepared by suspension polymerization in the presence of a catalyst system.

This catalyst system contains, as component A), a finely divided carrier which is treated with trialkylaluminum and preferably has a particle diameter of from 1 to 200 μm, in particular from 30 to 70 μm. Suitable carrier materials are, for example, silica gels of the formula $SiO.aAl_2O_3$, where a is from 0 to 2, preferably from 0 to 0.5; these are therefore aluminosilicates or silica. Such products are commercially available, for example Silica Gel 332 from Grace. Silica gels which have a water content of from 2 to 12% by weight (determined as the weight loss on heating up to 200° C. at 10 K/min) are preferred.

Other inorganic oxides, such as $Al_2O_3$, $TiO_2$ or $ThO_2$, can also be used as carriers.

The treatment of the carrier with trialkylaluminum is carried out with an amount of from 0.1 to 3, preferably from 0.3 to 1.2, in particular from 0.5 to 0.8, mol/(kg of carrier×% water content). Trimethylaluminum is preferably used.

This catalyst system contains, as component B), a metallocene complex, preferably of metals of subgroups IV and V of the Periodic Table.

Particularly suitable metallocene complexes are of the general formula I:

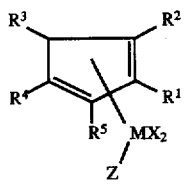

where

M is titanium, zirconium, hafnium, vanadium, niobium or tantalum,

X is fluorine, chlorine, bromine, iodine, hydrogen, $C_1$–$C_{10}$-alkyl, $C_6$–$C_{15}$-aryl or —$OR^6$, $R^6$ is $C_1$–$C_{10}$-alkyl, $C_6$–$C_{15}$-aryl, alkylaryl, arylalkyl, fluoroalkyl or fluoroaryl, each of 1 to 10 carbon atoms in the alkyl radical and 6 to 20 carbon atoms in the aryl radical, $R^1$ to $R^5$ are each hydrogen, $C_1$–$C_{10}$-alkyl, 5-membered to 7-membered cycloalkyl which in turn may carry a $C_1$–$C_6$-alkyl as a substituent, $C_6$–$C_{15}$-aryl or arylalkyl, where two neighboring radicals together may furthermore form a cyclic group of 4 to 15, preferably 8 to 15, carbon atoms, or $Si(R^7)_3$, $R^7$ is $C_1$–$C_{10}$-alkyl, $C_6$–$C_{15}$-aryl or $C_3$–$C_{10}$-cycloalkyl, Z is X or

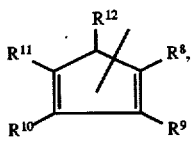

$R^8$ to $R^{12}$ are each hydrogen, $C_1$–$C_{10}$-alkyl, 5-membered to 7-membered cycloalkyl which in turn may carry a $C_1$–$C_{10}$-alkyl as a substituent, $C_6$–$C_{15}$-aryl or arylalkyl, where two neighboring radicals together may furthermore form a cyclic group of 4 to 15, preferably 8 to 15, carbon atoms, or $Si(R^{13})_3$, $R^{13}$ is $C_1$–$C_{10}$-alkyl, $C_6$–$C_{15}$-aryl or $C_3$–$C_{10}$-cycloalkyl, or $R^4$ and Z together form a group —$[Y(R^{14})_2]_n$—E—, Y is silicon, germanium, tin or carbon, $R^{14}$ is $C_1$–$C_{10}$-alkyl, $C_3$–$C_{10}$-cycloalkyl or $C_6$–$C_{10}$-aryl, n is 1, 2, 3 or 4, E is

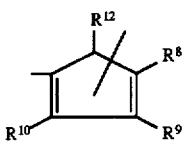

or A.

A is —O—, —S—, >NR$^{15}$ or >PR$^{15}$.

R$^{15}$ is C$_1$–C$_{10}$-alkyl, C$_6$–C$_{15}$-aryl, C$_3$–C$_{10}$-cycloalkyl, alkylaryl or Si(R$^{16}$)$_3$ and R$^{16}$ is C$_1$–C$_{10}$-alkyl, C$_6$–C$_{15}$-aryl, C$_3$–C$_{10}$-cycloalkyl or alkylaryl.

Among the metallocene complexes of the general formula I,

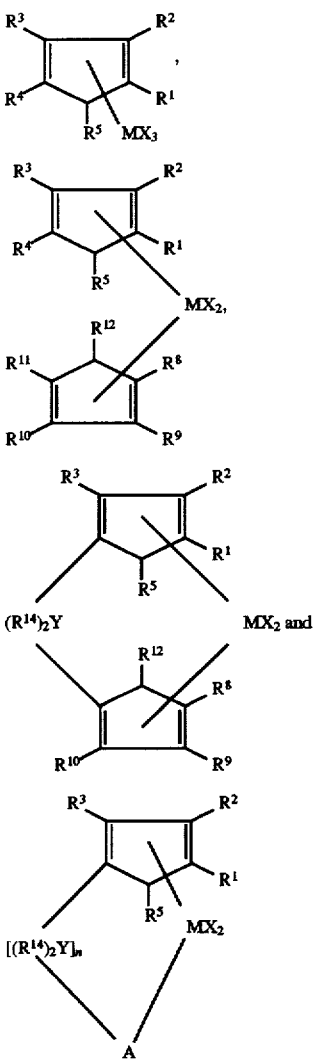

are preferred.

The term metallocenes is therefore understood as meaning not only the bis(η-cyclopentadienyl)-metal complexes.

Particularly preferred compounds of the formula Ia are those in which

M is titanium, zirconium or hafnium,

X is chlorine and

R$^1$ to R$^5$ are each hydrogen or C$_1$–C$_4$-alkyl.

Preferred compounds of the formula Ib are those in which

M is titanium, zirconium or hafnium,

X is chlorine, C$_1$–C$_4$-alkyl or phenyl,

R$^1$ to R$^5$ are each hydrogen, C$_1$–C$_4$-alkyl or Si(R$^7$)$_3$ and

R$^8$ to R$^{12}$ are each hydrogen, C$_1$–C$_4$-alkyl or Si(R$^{13}$)$_3$.

Particularly suitable compounds of the formula Ib are those in which the cyclopentadienyl radicals are identical.

Examples of particularly suitable compounds include:

bis(cyclopentadienyl)zirconium dichloride, bis(pentamethylcyclopentadienyl)zirconium dichloride, bis(cyclopentadienyl)diphenylzirconium, bis(methylcyclopentadienyl)zirconium dichloride, bis(ethylcyclopentadienyl)zirconium dichloride, bis(n-butylcyclopentadienyl)zirconium dichloride and bis(trimethylsilylcyclopentadienyl)zirconium dichloride and the corresponding dimethylzirconium compounds.

Particularly suitable compounds of the formula Ic are those in which

R$^1$ and R$^8$ are identical and are each hydrogen or C$_1$–C$_{10}$-alkyl,

R$^5$ and R$^{12}$ are identical and are each hydrogen, methyl, ethyl, isopropyl or tert-butyl, R$^3$ and R$^{10}$ are each C$_1$–C$_4$-alkyl, R$^2$ and R$^9$ are each hydrogen or two neighboring radicals R$^2$ and R$^3$ on the one hand and R$^9$ and R$^{10}$ on the other hand together form a cyclic group of 4 to 12 carbon atoms, R$^{14}$ is C$_1$–C$_8$-alkyl, M is titanium, zirconium or hafnium, Y is silicon, germanium, tin or carbon and X is chlorine or C$_1$–C$_4$-alkyl.

Examples of particularly suitable complexes include dimethylsilanediylbis(cyclopentadienyl)zirconium dichloride, dimethylsilanediylbis(indenyl)zirconium dichloride, dimethylsilanediylbis(tetrahydroindenyl)zirconium dichloride, ethylenebis(cyclopentadienyl)zirconium dichloride, ethylenebis(indenyl)zirconium dichloride, ethylenebis(tetrahydroindenyl)zirconium dichloride, tetramethylethylene-9-fluorenylcyclopentadienylzirconium dichloride, dimethylsilanediylbis(3-tert-butyl-5-methylcyclopentadienyl)zirconium dichloride, dimethylsilanediylbis(3-tert-butyl-5-ethylcyclopentadienyl)zirconium dichloride, dimethylsilanediylbis(3-tert-butyl-5-methylcyclopentadienyl)-di-methylzirconium, dimethylsilanediylbis(2-methylindenyl)zirconium dichloride, dimethylsilanediylbis(2-isopropylidenyl)zirconium dichloride, dimethylsilanediylbis(2-tert-butylindenyl)zirconium dichloride, diethylsilanediylbis(2-methylindenyl)zirconium dibromide, dimethylsilanediylbis(2-methyl-5-methylcyclopentadienyl)zirconium dichloride, dimethylsilanediylbis(2-ethyl-5-isopropylcyclopentadienyl)zirconium dichloride, dimethylsilanediylbis(2-methylindenyl)zirconium dichloride, dimethylsilanediylbis(2-methylbenzindenyl)zirconium dichloride and dimethylsilanediylbis(2-methylindenyl)hafnium dichloride.

Particularly suitable compounds of the general formula Id are those in which

M is titanium or zirconium,

X is chlorine or $C_1$–$C_{10}$-alkyl,

Y is silicon or carbon when n is 1 or is carbon when n is 2, $R^{14}$ is $C_1$–$C_8$-alkyl, $C_5$–$C_6$-cycloalkyl or $C_6$–$C_{10}$-aryl, A is —O—, —S—, or >$NR^{15}$ and $R^1$ to $R^3$ and $R^5$ are each hydrogen, $C_1$–$C_{10}$-alkyl, $C_3$–$C_{10}$-cycloalkyl, $C_6$–$C_{15}$-aryl or $Si(R^7)_3$, or two neighboring radicals form a cyclic group of 4 to 12 carbon atoms.

Particularly preferred metallocene complexes of the general formula I are those in which at least one of the radicals $R^1$ to $R^5$ is not hydrogen and in particular is $C_1$–$C_{10}$-alkyl, compounds of the formula Ib, in particular bis(n-butylcyclopentadienyl)zirconium dichloride, being preferably used.

The synthesis of such complexes can be carried out by methods known per se, the reaction of the correspondingly substituted, cyclic hydrocarbon anions with halides of titanium, zirconium, hafnium, vanadium, niobium or tantalum being preferred.

Examples of corresponding preparation processes are described in, inter alia, Journal of Organometallic Chemistry, 369 (1989), 359–370.

μ-Oxobis(chlorobiscyclopentadienyl)zirconium may also be used as a metallocene complex.

The catalyst systems also contain open-chain or cyclic alumoxane compounds as component C.

For example, open-chain or cyclic alumoxane compounds of the general formula II or III

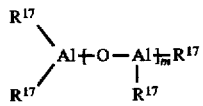

II

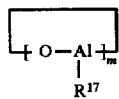

III where $R^{17}$ is $C_1$–$C_4$-alkyl, preferably methyl or ethyl, and m is an integer from 5 to 30, preferably from 10 to 25, are suitable.

The preparation of these oligomeric alumoxane compounds is usually carried out by reacting a solution of a trialkylaluminum with water and is described, inter alia, in EP-A 284 708 and U.S. Pat. No. 4,794,096.

As a rule, the oligomeric alumoxane compounds obtained are present as mixtures of both linear and cyclic chain molecules of different lengths, so that m is to be regarded as an average value. The alumoxane compounds may also be present as a mixture with other metal alkyls, preferably with alkylaluminums.

The catalyst systems contain, as component D), an alkali metal alkyl or an alkaline earth metal alkyl or a mixture thereof. Alkali metal or alkaline earth metal alkyls of the general formula IV or V $M^1R^{18}$      IV $M^2(R^{19})_2$      V where $M^1$ is lithium, sodium, potassium, rubidium or cesium, $M^2$ is beryllium, magnesium, calcium, strontium or barium and $R^{18}$ and $R^{19}$ are $C_1$–$C_8$-alkyl, are preferred.

$M^1$ is preferably lithium, $M^2$ is magnesium and $R^{18}$ and $R^{19}$ are each preferably straight-chain $C_1$–$C_8$-alkyl, in particular $C_1$–$C_4$-alkyl. n-Butyllithium is particularly suitable.

In a preferred procedure for the preparation of the catalyst system, the metallocene complex is applied to the carrier pretreated with trialkylaluminum. The pretreated carrier is preferably impregnated with a solution of metallocene complex (component B) and alumoxane compound (component C), aromatic hydrocarbons, in particular toluene, preferably being used as the solvent. The mixture is then evaporated to dryness or filtered and dried. The molar ratio of Al from the alumoxane compound to the metal M from the metallocene complex is from 50:1 to 2000:1, preferably from 100:1 to 1000:1, in particular from 200:1 to 600:1. The amount of impregnating solution is chosen so that the carrier impregnated with the solution of metallocene complex and alumoxane compound contains from 5 to 50 μmol of metallocene per gram after drying.

The component D) is added to the polymerization as an unsupported catalyst component. The amount of D) is from 0.2 to 10, preferably from 0.5 to 5, in particular from 1 to 3 mmol per gram of supported catalyst.

The suspension polymerization is known per se. Usually, polymerization is effected in a suspending agent, preferably in an alkane. The polymerization temperatures are from −20° to 115° C. and the pressure is from 1 to 100 bar. The solids content of the suspension is in general from 10 to 80%. The process can be carried out both batchwise, for example in stirred autoclaves, and continuously, for example in tube reactors, preferably in loop reactors. In particular, the Phillips PF process, as described in U.S. Pat. No. 3,242,150 and U.S. Pat. No. 3,248,179, can be used.

In the novel process, there are no problems at all with wall deposits and formation of lumps. In addition, polymers of ethylene having a narrow molecular weight distribution and, in the case of the copolymers of ethylene, having a narrow, homogeneous comonomer distribution and low densities are formed.

EXAMPLES

Example 1

Preparation of a supported catalyst

In a dry reactor flushed with nitrogen, 4.0 kg of $SiO_2$ (Grace, SG332, mean particle diameter 50 μm, 5% by weight of $H_2O$) were suspended in 30 l of heptane and thermostatted at 18° C. 11.2 l of a 1 molar solution of trimethylaluminum (TMA) in heptane were added dropwise in the course of 60 minutes, the temperature being kept below 30° C. At the end of the TMA addition, stirring was continued for a further 7 hours. The suspension was filtered and the residue was washed with twice 10 l of heptane. After drying under reduced pressure at 50° C., the modified carrier remained as a free-flowing powder having an aluminum content of 6.6% by weight.

0.94 kg of the modified carrier was added to a solution of 6.80 kg (16.81 mmol) of bis(n-butylcyclopentadienyl) zirconium dichloride in 4.92 l of a 1.53 molar solution of methylalumoxane in toluene at room temperature after stirring for 20 minutes, and stirring was continued for a further 60 minutes. The solvent was then removed at 50° C. under reduced pressure. A yellow, free-flowing powder (1.34 kg) having an aluminum content of 15.9% by weight and a zirconium content of 0.10% by weight was formed. Accordingly, the total molar ratio Al:Zr was 540:1.

Examples 2 to 6
Preparation of a homopolyethylene by batchwise suspension polymerization temperature was 100° C. The yield was 630 g. Further data are shown in Table 1.

Wall deposits and lumps did not occur in any of Examples 3 to 6.

Comparative Example VI

The procedure was as in Example 2, except that 511 mg of supported catalyst were used and no n-butyllithium was added. After 25 minutes, the polymerization had to be terminated owing to severe knocking of the stirrer. The autoclave contained 580 g of product in the form of a massive wall deposit and a few lumps.

TABLE 1

Analytical data of the homopolyethylenes of Examples 2 to 6

| Ex. | Supported catalyst [mg] | Polymerization temperature [°C.] | Yield [g] | Viscosity η [dl/g] | Bulk density [g/l] | Mw [$10^3$ g/mol] | Mn [$10^3$ g/mol] | Mw/Mn |
|---|---|---|---|---|---|---|---|---|
| 2 | 489 | 70 | 1820 | 3.49 | 290 | 225 | 92 | 2.44 |
| 3 | 521 | 60 | 2400 | 3.69 | 315 | 293 | 105 | 2.80 |
| 4 | 503 | 80 | 1600 | 3.18 | 243 | 224 | 97 | 2.30 |
| 5 | 518 | 90 | 1590 | 3.00 | 254 | 164 | 77 | 2.14 |
| 6 | 519 | 100 | 630 | 2.59 | 209 | 170 | 73 | 2.34 |

Example 2

4.5 l of isobutane and 60 mg of n-butyllithium were initially taken in a stirred 10 l steel autoclave after careful flushing with nitrogen and thermostatting at the polymerization temperature of 70° C. 489 mg of supported catalyst (from Example 1) were then flushed in with a further 0.5 l of isobutane, and ethylene was forced in to a total pressure of 38 bar. The pressure in the autoclave was kept constant by further metering of ethylene. After 90 minutes, the polymerization was terminated by letting down the autoclave. 1820 g of polymer were obtained in the form of free-flowing granules. No wall deposits or formation of lumps were observed in the autoclave.

The analytical data are shown in Table 1.

Example 3

The procedure was as in Example 2, except that 521 mg of supported catalyst were used and the polymerization temperature was 60° C. The yield was 2400 g. Further data are shown in Table 1.

Example 4

The procedure was as in Example 2, except that 503 mg of supported catalyst were used and the polymerization temperature was 80° C. The yield was 1600 g. Further data are shown in Table 1.

Example 5

The procedure was as in Example 2, except that 518 mg of supported catalyst were used and the polymerization temperature was 90° C. The yield was 1590 g. Further data are shown in Table 1.

Example 6

The procedure was as in Example 2, except that 519 mg of supported catalyst were used and the polymerization Examples 7 to 11
Preparation of ethylene-1-butene copolymers by batchwise suspension polymerization Example 7

The procedure was as in Example 2, except that 498 mg of supported catalyst were used and 50 ml of 1-butene were initially taken in addition to the isobutane. The yield was 1250 g. Further data are shown in Table 2.

Example 8

The procedure was as in Example 2, except that 508 mg of supported catalyst were used and 100 ml of 1-butene were initially taken in addition to the isobutane. The yield was 1350 g. Further data are shown in Table 2.

Example 9

The procedure was as in Example 2, except that 513 mg of supported catalyst were used and 200 ml of 1-butene were initially taken in addition to the isobutane. The yield was 1520 g. Further data are shown in Table 2.

Example 10

The procedure was as in Example 2, except that 529 mg of supported catalyst were used and 400 ml of 1-butene were initially taken in addition to the isobutane. The yield was 1250 g. Further data are shown in Table 2.

Example 11

The procedure was as in Example 2, except that 527 mg of supported catalyst were used and 400 ml of 1-butene were initially taken in addition to the isobutane, and the polymerization temperature was 80° C. The yield was 1380 g. Further data are shown in Table 2.

Wall deposits and lumps did not occur in any of Examples 7–11.

TABLE 2

Analytical data of the ethylene/1-butene copolymers from Examples 7 to 11

| Ex. | Supported catalyst [mg] | Polymerization temperature [°C.] | 1-Butene [ml] | Yield [g] | Viscosity η [dl/g] | Density [g/cm³] | 1-Butene content [% by wt.] | Bulk density [g/l] | Mw [10³ g/mol] | Mn [10³ g/mol] | Mw/Mn |
|---|---|---|---|---|---|---|---|---|---|---|---|
| 7 | 489 | 70 | 50 | 1250 | 2.42 | 0.9381 | n.d. | 247 | 138 | 66 | 2.08 |
| 8 | 508 | 70 | 100 | 1350 | 2.02 | 0.9318 | n.d. | 285 | 124 | 59 | 2.10 |
| 9 | 513 | 70 | 200 | 1520 | 1.88 | 0.9293 | 2.4 | 263 | 104 | 54 | 1.94 |
| 10 | 529 | 70 | 400 | 1250 | 1.96 | 0.9240 | 3.7 | 281 | 103 | 50 | 2.04 |
| 11 | 527 | 80 | 400 | 1380 | 2.03 | 0.9203 | 4.4 | 269 | 118 | 55 | 2.14 | n.d. = not determined

Example 12

Preparation of a homopolyethylene by continuous suspension polymerization

The polymerization was carried out in a continuously operated loop reactor, ie. a tube reactor closed by means of arcs, in which an isobutane suspension of the polymer formed was circulated with the aid of a pump present in the tube. The principle of this type of reactor is described, for example, in U.S. Pat. No. 3,242,150 and U.S. Pat. No. 3,248,179. The reactor had a volume of 0.18 m³.

To carry out the polymerization, 15 kg/h of ethylene, 35 kg/h of isobutane, 5.8 g/h of supported catalyst (from Example 1) and 0.4 g/h of n-butyllithium were metered continuously into the reactor. At 40 bar and a polymerization temperature of 70° C., the resulting ethylene content of the liquid phase was 24% by volume and the solids content of the suspension was 240 kg/m³. The polymer output was 14.5 kg/h. The analytical data of the product obtained are shown in Table 3.

Example 13

Preparation of an ethylene-1-butene copolymer by continuous suspension polymerization The procedure was as in Example 12, except that 16 kg/h of ethylene, 1.6 kg/h of 1-butene, 34 kg/h of isobutane, 4.9 g/h of supported catalyst and 0.4 g/h of n-butyllithium were metered. The resulting ethylene content of the liquid phase was 26% by volume and the 1-butene content of the liquid phase was 10% by volume. The solids content of the suspension was 230 kg/M³. The polymer output was 15 kg/h. The analytical data of the product obtained are shown in Table 3.

The uniformity of comonomer incorporation was demonstrated by ATREF (analytical temperature rising elution fractionation). The figure shows the dependence of the eluted material on the elution temperature. The elution curve is monomodal and comparatively narrow. In particular, no components of HDPE (elution at about 100° C.) are to be found. The method is described in L. Wild, Adv. Polym. Sci. 98 (1990), 1–47 on page 13 et seq. The eluant used was 1,2,4-trichlorobenzene.

Table 3

Analytical data of the polymers from the continuous polymerization

TABLE 3

Analytical data of the polymers from the continuous polymerization

| | Example 12 | Example 13 |
|---|---|---|
| Productivity [g of polymer/g of total catalyst system] | 2400 | 2800 |
| MFI [g/10 min] | 0.2 | 1.0 |
| HLMI [g/10 min] | 3.6 | 16 |
| Density [g/cm³] | 0.945 | 0.911 |
| 1-Butene content [% by wt.] | — | 7.9 |
| Bulk density [g/l] | 260 | 240 |
| Viscosity η [dl/g] | 3.28 | 1.95 |
| Mw [10³ g/mol] | 219 | 121 |
| Mn [10³ g/mol] | 79 | 63 |
| Mw/Mn | 2.77 | 1.92 |
| Cold heptane extract [% by wt.] | 0.1 | 0.1 |
| Dart Drop Index [g] (40 μm film) | — | 1100 |
| Dart Drop Index [g] (25 μm film) | — | 790 |

The following methods were used for characterizing the products:

MFI and HLMI: DIN 53 735, weight applied 2.16 or 21.6 kg

ηvalue: DIN 53 733

Bulk density: DIN 53 468

Density: DIN 53 479

Weight average molecular weight Mw and number average molecular weight Mn: gel permeation chromatography 1-Butene content: determination by $^{13}C$—NMR and IR spectroscopy Cold heptane extract: 100 g of polymer are stirred in 1 l of heptane for 2 hours at 25° C. and then filtered off. The filtrate is evaporated to dryness and weighed.

Dart Drop Index: measured on blown films according to ASTM D1709

We claim:

1. A process for the preparation of homopolymers of ethylene or copolymers of ethylene with another olefin or a mixture of other olefins by suspension polymerization in the presence of a catalyst system, wherein the catalyst system contains, as active components, A) a finely divided carrier treated with trialkylaluminum, B) a metallocene complex, C) an open-chain or cyclic alumoxane compound and D) an alkali metal alkyl or alkaline earth metal alkyl or mixtures thereof.

2. The process of claim 1, wherein a carrier having a particle diameter of from 1 to 200 μm is used as component A.

3. The process of claim 1, wherein a silica gel treated with trimethylaluminum is used as component A.

4. The process of claim 1, wherein a metallocene complex of the formula I

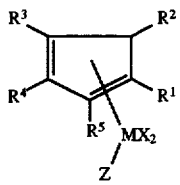

where

M is titanium, zirconium, hafnium, vanadium, niobium or tantalum,

X is fluorine, chlorine, bromine, iodine, hydrogen, $C_1$–$C_{10}$-alkyl, $C_6$–$C_{15}$-aryl or —$OR^6$, $R^6$ is $C_1$–$C_{10}$-alkyl, $C_6$–$C_{15}$-aryl, alkylaryl, arylalkyl, fluoroalkyl or fluoroaryl, each of 1 to 10 carbon atoms in the alkyl radical and 6 to 20 carbon atoms in the aryl radical, $R^1$ to $R^5$ are each hydrogen, $C_1$–$C_{10}$-alkyl, 5-membered to 7-membered cycloalkyl which in turn may carry a $C_1$–$C_{10}$-alkyl as a substituent, $C_6$–$C_{15}$-aryl or arylalkyl, where two neighboring radicals together may furthermore form a cyclic group of 4 to 15 carbon atoms, or $Si(R^7)_3$, $R^7$ is $C_1$–$C_{10}$-alkyl, $C_6$–$C_{15}$-aryl or $C_3$–$C_{10}$-cycloalkyl, Z is X or

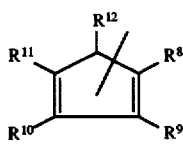

$R^8$ to $R^{12}$ are each hydrogen, $C_1$–$C_{10}$-alkyl, 5-membered to 7-membered cycloalkyl which in turn may carry a $C_1$–$C_{10}$-alkyl as a substituent, $C_6$–$C_{15}$-aryl or arylalkyl, where two neighboring radicals together may furthermore form a cyclic group of 4 to 15 carbon atoms, or $Si(R^{13})_3$, $R^{13}$ is $C_1$–$C_{10}$-alkyl, $C_6$–$C_{15}$-aryl or $C_3$–$C_{10}$-cycloalkyl, or $R^4$ and Z together form a group —$[Y(R^{14})_2]_n$—E—, Y is silicon, germanium, tin or carbon, $R^{14}$ is $C_1$–$C_{10}$-alkyl, $C_3$–$C_{10}$-cycloalkyl or $C_6$–$C_{15}$-aryl, n is 1, 2, 3 or 4, E is

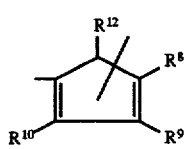

or A,

A is

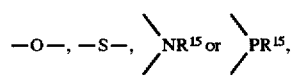

$R^{15}$ is $C_1$–$C_{10}$-alkyl, $C_6$–$C_{15}$-aryl, $C_3$–$C_{10}$-cycloalkyl, alkylaryl or $Si(R^{16})_3$ and $R^{16}$ is $C_1$–$C_{10}$-alkyl, $C_6$–$C_{15}$-aryl, $C_3$–$C_{10}$-cycloalkyl or alkylaryl is used as component B.

5. The process of claim 1, wherein an open-chain or cyclic alumoxane compound of the formula II or III

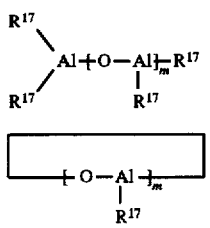

where $R^{17}$ is $C_1$–$C_4$-alkyl and m is an integer from 5 to 30, is used as component C.

6. The process of claim 1, wherein an alkali metal alkyl or alkaline earth metal alkyl of the formula IV or V

  IV

  V where $M^1$ is lithium, sodium, potassium, rubidium or cesium, $M^2$ is beryllium, magnesium, calcium, strontium, barium or radium and $R^{18}$ and $R^{19}$ are each $C_1$–$C_8$-alkyl, or a mixture thereof is used as component D.

7. A homopolymer of ethylene or copolymer of ethylene with another olefin or a mixture of other olefins, obtained by the process of claim 1.

8. The process of claim 1, wherein component B is a metallocene complex of the formula Ib

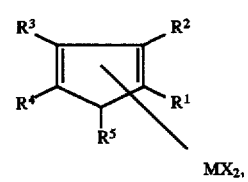

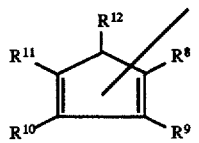

in which

M is titanium, zirconium or hafnium,

X is chlorine, $C_1$–$C_4$-alkyl or phenyl, $R^1$ to $R^5$ are each hydrogen, $C_1$–$C_4$-alkyl or $Si(R^7)_3$ and $R^8$ to $R^{12}$ are each hydrogen, $C_1$–$C_4$-alkyl or $Si(R^{13})_3$ $R^7$ is $C_1$–$C_{10}$-alkyl, $C_6$–$C_{15}$-aryl or $C_1$–$C_{10}$-cycloalkyl, and $R^{13}$ is $C_1$–$C_{10}$-alkyl, $C_6$–$C_{15}$-aryl or $C_3$–$C_{10}$-cycloalkyl.

9. The process of claim 1, wherein component B is bis(cyclopentadienyl)zirconium dichloride, bis(pentamethylcyclopentadienyl)zirconium dichloride, bis(cyclopentadienyl)diphenylzirconium, bis(methylcyclopentadienyl)zirconium dichloride, bis(ethylcyclopentadienyl)zirconium dichloride, bis(n-butylcyclopentadienyl)zirconium dichloride or bis(trimethylsilylcyclopentadienyl)zirconium dichloride or one of the corresponding dimethylzirconium compounds.

10. The process of claim 1, wherein the amount of component D is from 0.2 to 10 mmol per gram of supported catalyst.

11. The process of claim 1, wherein from 0.2 to 10 mmol per gram of supported catalyst of an alkali metal alkyl or alkaline earth metal alkyl of the formula IV or V $$M^1 R^{18} \quad\quad IV$$

$$M^2 (R^{19})_2 \quad\quad V$$

where $M^1$ is lithium, sodium, potassium, rubidium or cesium, $M^2$ is beryllium, magnesium, calcium, strontium, barium or radium and $R^{18}$ and $R^{19}$ are each $C_1$–$C_8$-alkyl, or a mixture thereof is used as component D.

12. The process of claim 1, wherein n-butyl-lithium is used as component D.

13. A process of claim 1, wherein from 0.2 to 10 mmol per gram of supported catalyst of n-butyl-lithium is used as component D.

14. The process of claim 1, wherein a metallocene complex of the formula Ib

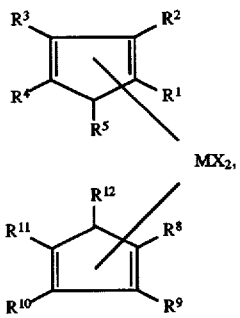

in which

M is titanium, zirconium or hafnium,

X is chlorine, $C_1$–$C_4$-alkyl or phenyl, $R^1$ to $R^5$ are each hydrogen, $C_1$–$C_4$-alkyl or $Si(R^7)_3$ and $R^8$ to $R^{12}$ are each hydrogen, $C_1$–$C_4$-alkyl or $Si(R^{13})_3$ $R^7$ is $C_1$–$C_{10}$-alkyl, $C_6$–$C_{15}$-aryl or $C_1$–$C_{10}$-cycloalkyl, and $R^{13}$ is $C_1$–$C_{10}$-alkyl, $C_6$–$C_{15}$-aryl or $C_3$–$C_{10}$-cycloalkyl is used as component B along with from 0.2 to 10 mmol per gram of supported catalyst of component D.

15. The process of claim 1, wherein a metallocene complex of the formula Ib

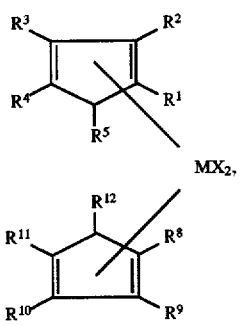

in which

M is titanium, zirconium or hafnium,

X is chlorine, $C_1$–$C_4$-alkyl or phenyl, $R^1$ to $R^5$ are each hydrogen, $C_1$–$C_4$-alkyl or $Si(R^7)_3$ and $R^8$ to $R^{12}$ are each hydrogen, $C_1$–$C_4$-alkyl or $Si(R^{13})_3$ $R^7$ is $C_1$–$C_{10}$-alkyl, $C_6$–$C_{15}$-aryl or $C_1$–$C_{10}$-cycloalkyl, and $R^{13}$ is $C_1$–$C_{10}$-alkyl, $C_6$–$C_{15}$-aryl or $C_3$–$C_{10}$-cycloalkyl is used as component B and from 0.2 to 10 mmol per gram of supported catalyst of an alkali metal alkyl or alkaline earth metal alkyl of the formula IV or V $$M^1 R^{18} \quad\quad IV$$

$$M^2 (R^{19})_2 \quad\quad V$$

where $M^1$ is lithium, sodium, potassium, rubidium or cesium, $M^2$ is beryllium, magnesium, calcium, strontium, barium or radium and $R^{18}$ and $R^{19}$ are each $C_1$–$C_8$-alkyl, or a mixture thereof is used as component D.

16. The process of claim 1, wherein a metallocene complex of the formula Ib

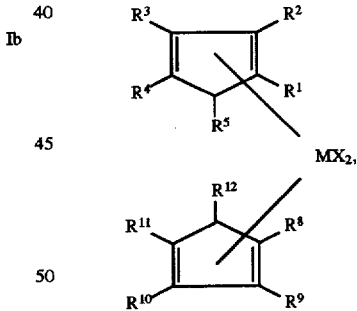

in which

M is titanium, zirconium or hafnium,

X is chlorine, $C_1$–$C_4$-alkyl or phenyl, $R^1$ to $R^5$ are each hydrogen, $C_1$–$C_4$-alkyl or $Si(R^7)_3$ and $R^8$ to $R^{12}$ are each hydrogen, $C_1$–$C_4$-alkyl or $Si(R^{13})_3$ $R^7$ is $C_1$–$C_{10}$-alkyl, $C_6$–$C_{15}$-aryl or $C_1$–$C_{10}$-cycloalkyl, and $R^{13}$ is $C_1$–$C_{10}$-alkyl, $C_6$–$C_{15}$-aryl or $C_3$–$C_{10}$-cycloalkyl is used as component B and from 0.2 to 10 mmol per gram of supported catalyst of n-butyl-lithium is used as component D.

17. The process of claim 1, wherein bis(cyclopentadienyl)zirconium dichloride, bis(pentamethylcyclopentadienyl)zirconium dichloride, bis(cyclopentadienyl)diphenylzirconium,
bis(methylcyclopentadienyl)zirconium dichloride,
bis(ethylcyclopentadienyl)zirconium dichloride,
bis(n-butylcyclopentadienyl)zirconium dichloride or
bis(trimethylsilylcyclopentadienyl)zirconium dichloride or the corresponding dimethylzirconium compounds is used as component B along with from 0.2 to 10 mmol per gram of supported catalyst of component D.

18. The process of claim 1, wherein
bis(cyclopentadienyl)zirconium dichloride,
bis(pentamethylcyclopentadienyl)zirconium dichloride,
bis(cyclopentadienyl)diphenylzirconium,
bis(methylcyclopentadienyl)zirconium dichloride,
bis(ethylcyclopentadienyl)zirconium dichloride,
bis(n-butylcyclopentadienyl)zirconium dichloride or
bis(trimethylsilylcyclopentadienyl)zirconium dichloride or the corresponding dimethylzirconium compounds is used as component B and from 0.2 to 10 mmol per gram of supported catalyst of an alkali metal alkyl or alkaline earth metal alkyl of the formula IV or V $$M^1 R^{18} \qquad \qquad IV$$

$$M^2 (R^{19})_2 \qquad \qquad V$$

where $M^1$ is lithium, sodium, potassium, rubidium or cesium, $M^2$ is beryllium, magnesium, calcium, strontium, barium or radium and $R^{18}$ and $R^{19}$ are each $C_1$–$C_8$-alkyl, or a mixture thereof is used as component D.

19. The process of claim 1, wherein
bis(cyclopentadienyl)zirconium dichloride,
bis(pentamethylcyclopentadienyl)zirconium dichloride,
bis(cyclopentadienyl)diphenylzirconium,
bis(methylcyclopentadienyl)zirconium dichloride,
bis(ethylcyclopentadienyl)zirconium dichloride,
bis(n-butylcyclopentadienyl)zirconium dichloride or
bis(trimethylsilylcyclopentadienyl)zirconium dichloride or the corresponding dimethylzirconium compounds is used as component B and n-butyllithium is used as component D.

20. The process of claim 1, wherein
bis(cyclopentadienyl)zirconium dichloride,
bis(pentamethylcyclopentadienyl)zirconium dichloride,
bis(cyclopentadienyl)diphenylzirconium,
bis(methylcyclopentadienyl)zirconium dichloride,
bis(ethylcyclopentadienyl)zirconium dichloride,
bis(n-butylcyclopentadienyl)zirconium dichloride or
bis(trimethylsilylcyclopentadienyl)zirconium dichloride or the corresponding dimethylzirconium compounds is used as component B and from 0.2 to 10 mmol per gram of supported catalyst of n-butyllithium is used as component D.

* * * * *